(12) United States Patent
Ki (10) Patent No.: US 6,308,444 B1
(45) Date of Patent: Oct. 30, 2001

(54) LIGHT ILLUMINATED DISPLAY BOARD AND LAMPSHADE USING LIGHT REFRACTION AND REFLECTION EFFECT OF TRANSPARENT ACRYLIC PLASTIC PLATES

(76) Inventor: Kil Woong Ki, Jungang Heights Apt. 101-1503, 162-2 Chunggye-Dong, Nowon-Ku, Seoul,139-224 (KR)

( * ) Notice: Subject to any disclaimer, the term of this patent is extended or adjusted under 35 U.S.C. 154(b) by 0 days.

(21) Appl. No.: 09/541,085

(22) Filed: Mar. 31, 2000

(30) Foreign Application Priority Data

Jul. 16, 1999 (KR) .................................................. 99/14094

(51) Int. Cl.[7] .......................... G09F 13/18; G01D 11/28; F21V 7/04; F21V 9/00; F21V 29/00
(52) U.S. Cl. ............................ 40/546; 362/294; 362/295; 362/293; 362/31; 362/812
(58) Field of Search ............................ 40/541, 546, 554; 362/294, 373, 295, 293, 31, 27; 368/812

(56) References Cited

U.S. PATENT DOCUMENTS

| | | | |
|---|---|---|---|
| 1,930,359 | * 10/1933 | Hilgenberg | 40/546 |
| 1,994,519 | * 3/1935 | James | 40/546 |
| 2,347,665 | * 5/1944 | Christensen et al. | 40/546 |
| 2,404,627 | * 7/1946 | Goldberg | 40/546 |
| 2,623,313 | * 12/1952 | Fuchs | 40/546 |
| 3,456,106 | * 7/1969 | Gluschkin | 40/546 |
| 4,648,189 | * 3/1987 | Michel | 40/546 |
| 4,974,354 | * 12/1990 | Hembrook, Jr. | 40/546 |
| 5,027,258 | * 6/1991 | Schoniger et al. | 362/31 |
| 5,124,890 | 6/1992 | Choi et al. | |
| 5,138,783 | * 8/1992 | Forsse | 40/546 |
| 5,283,968 | * 2/1994 | Williams | 40/546 |
| 5,375,015 | * 12/1994 | Itoh et al. | 359/845 |
| 6,053,621 | * 4/2000 | Yoneda | 362/245 |
| 6,082,877 | * 7/2000 | Hughes | 362/360 |
| 6,160,495 | * 12/2000 | Demink et al. | 340/944 |

* cited by examiner

Primary Examiner—Lynne H. Browne
Assistant Examiner—Kenn Thompson
(74) Attorney, Agent, or Firm—Birch, Stewart, Kolasch & Birch, LLP (57) ABSTRACT

A light illuminated display board and a lampshade using a light refraction and reflection effect in laminated transparent acrylic plastic plates is disclosed. The plastic plates are precisely cut at their four edge surfaces to form specifically angled and segmented edge surfaces individually having two to five surface segments. At least one of opposite surfaces of each plastic plate is inscribed with desired letters, symbols, figures or a combination of them. The display board or the lampshade of this invention thus clearly displays the desired letters, symbols, figures or the combination of them on its display surface while illuminating them using a variety of color light beams. Due to heat dissipating bodies set between the light bulbs and the angled and segmented edge surfaces of the plastic plates, heat of the light bulbs is actively and effectively dissipated to the surroundings, and so the display board or the lampshade is thus usable for a lengthy period of time without being thermally distorted or damaged. Each transparent acrylic plastic plate is also provided with grooves having a V-shaped cross-section, scratched areas, and specifically cut color sheets, thereby accomplishing a desired clear displaying effect in addition to a cubic effect for the letters, symbols or figures to be displayed on the display surface.

11 Claims, 10 Drawing Sheets

LIGHT ILLUMINATED DISPLAY BOARD AND LAMPSHADE USING LIGHT REFRACTION AND REFLECTION EFFECT OF TRANSPARENT ACRYLIC PLASTIC PLATES

BACKGROUND OF THE INVENTION

1. Field of the Invention

The present invention relates, in general, to light illuminated display devices, such as display boards, and lighting devices, such as lamps, and, more particularly, to an improvement in such devices to accomplish a desired lighting effect with illumination light using a light refraction and reflection effect within transparent acrylic plastic plates.

2. Description of the Prior Art

As well known to those skilled in the art, a conventional light illuminated display board is designed to accomplish a desired illumination effect by an edge lighting-type structure. This edge lighting-type structure comprises a plurality of transparent or translucent plastic plates, with the four edge surfaces of each plastic plate being flat and a light source being arranged along each edge of each plate for emitting light to the displaying surface of the display board. In such a conventional edge lighting-type display board, the brightness of the displaying surface of the board is determined only by the arrangement and light intensity of the light sources arranged along the four edges of the plastic plates. Therefore, it is almost impossible for the conventional edge lighting-type display boards to accomplish a desired level of illumination and brightness, a desired alteration of both the illumination and brightness or a desired cubic effect for advertisements or notices displayed on the board.

U.S. Pat. No. 5,124,890, allowed to the inventor of this invention, discloses "Display Board Illuminated by Refracted Light". As disclosed in the above U.S. patent document, this display board comprises a plurality of transparent acrylic plastic plates, in which desired light is received from the light emerging edges of the plastic plates to the light receiving edges of the plates using a light refraction and reflection effect within the transparent acrylic plastic plates. The advertisements or notices of the display board, formed by letters, figures, symbols and/or a combination of them, are illuminated by refracted light. In the above display board, the four edges of each plastic plate are formed to be flat, thus individually having a flat surface.

In the above display board, a variety of lamps, such as light bulbs, may be preferably used as a light source illuminating the displaying surface of the board. The above bulbs are arranged within a closed and narrow space formed in the board frame, and so the bulbs may overheat the plastic plates. When high wattage bulbs are used in the display board in an effort to increase the light intensity of the bulbs and to accomplish a desired brightness of the displaying surface, the bulbs undesirably and exceedingly overheat both the acrylic plastic plates and the color sheets attached to the light receiving edges of the plastic plates. In such a case, the plastic plates and the color sheets may be thermally damaged to be discolored, deformed and/or distorted, thus causing a deterioration in both the color alteration and the light intensity of incident light in the case of using the display board for a lengthy period of time. The above display board thus may be remarkably reduced in its advertising effect or its lighting effect.

In a brief description, the conventional light illuminated display boards, fabricated with transparent acrylic plastic plates, are designed to receive light from the light emerging edges having flat surfaces to the light receiving edges having flat surfaces, thus failing to accomplish a desired lighting intensity or a desired brightness of the displaying surface particularly in day light. Another problem experienced in the conventional light illuminated display boards resides in that they may be thermally damaged to be discolored, distorted or deformed due to the lighting bulbs installed within the display boards. It is thus necessary to provide a light illuminated display board, which allows the advertisements or the notices of the displaying surface to be effectively illuminated by light to be clearly and prominently displayed on the surface in addition to accomplishment of a clear and prominent advertising effect and being effectively usable for a lengthy period of time.

On the other hand, most conventional indoor electric lamps, such as floor lamps and table lamps, have cylindrical or frusto-conical shades, typically made of light transmitting fabrics, such as natural fabrics and synthetic fabrics, or made of other sheet materials. In such indoor electric lamps, the shades intercept direct light from bulbs while accomplishing a desired indirect lighting effect.

Such conventional shades are merely designed to accomplish an indirect lighting effect of the indoor lamps. Of course, some shades, with the external surfaces of the shades printed with letters, figures, color designs, color patterns and/or a combination of them, have been proposed and used.

SUMMARY OF THE INVENTION

Accordingly, the present invention has been made keeping in mind the above problems occurring in the prior art, and an object of the present invention is to provide a light illuminated display board and a lampshade, which are designed to accomplish a desired lighting effect using a light refraction and reflection effect of transparent acrylic plastic plates, which accomplish a desired level of illumination and brightness, a desired alteration of both the illumination and brightness or a desired cubic effect for images or notices without being reduced in its desired lighting effect regardless of lapse of time, with the images or notices being formed on at least one of opposite surfaces of the display board fabricated with laminated transparent acrylic plastic plates or being formed on the lampshade and being effectively illuminated by light to be clearly and prominently displayed on the displaying surface.

In order to accomplish the above object, the present invention provides a light illuminated display board, fabricated with three or more laminated transparent acrylic plastic plates. The above display board also has a plurality of lamp partition plates interposed between the laminated plastic plates, a plurality of lamps set along the edges of each of the plastic plates and controlled by a programmable logic controller (PLC). A display board frame sets the laminated plastic plates, the lamps and the PLC therein in cooperation with a back plate, thus forming a desired display board.

In the above display board, the plastic plates are laminated together, with a plurality of packings positioned in the laminated junctions between the plastic plates at corners of the plates so as to form a space in the laminated junctions. The above plastic plates are also precisely cut at their edges to form specifically angled and segmented edge surfaces individually having two to five surface segments. A plurality of edge color sheets are attached to the surface segments so as to allow desired letters, figures, symbols or a combination of them to be illuminated by desired color light beams while being displayed on a display surface.

A plurality of heat dissipating bodies are set in the gaps between the lamps and the angled and segmented edge surfaces of the plastic plates, with an air ventilation hole being longitudinally formed in each of the heat dissipating bodies. A color reflection plate is attached to the rear surface of the last plastic plate at the junction between the last plastic plate and the back plate.

In the display board of this invention, the desired letters, figures or symbols are formed as follows. That is, the outline grooves of the letters, figures or symbols, having a V-shaped cross-section, are inscribed on the rear surface of a first plastic plate, while the rear surface of a middle plastic plate is scratched at areas corresponding to the closed areas within the outline grooves. In addition, a plurality of specifically cut color sheets, having shapes corresponding to the profiles of the scratched areas, are attached to both the front surface of the middle plastic plate and the rear surface of a last plastic plate at positions corresponding to the scratched areas. The plastic plates are, thereafter, laminated together, with the outline grooves, the scratched areas and the specifically cut color sheets of the plastic plates being precisely aligned with each other.

In the display board of this invention, the plastic plates are precisely cut at their edges to form the specifically angled and segmented edge surfaces individually having two to five surface segments. On the other hand, the edge color sheets, consisting of color bands formed by a combination of a plurality of narrow and wide lines having a variety of colors, luminosities and hues, are attached to the surface segments of the angled and segmented edge surfaces of the plastic plates. When the plastic plates are laminated together, the packings are positioned in the laminated junctions between the plastic plates so as to prevent a formation of water film at the laminated junctions. The above packings also form spaces at the laminated junctions so as to accomplish a cubic effect for the letters, figures or symbols displayed on the display surface.

In addition, a plurality of lamp partition plates are positioned at the laminated junctions of the plastic plates so as to change colors of the letters, figures or symbols displayed on the display surface while accomplishing an animation effect for the displayed letters, figures or symbols. In the above display board, the scratched areas are formed on opposite surfaces of the plastic plates, with the specifically cut color sheets being attached to the middle and last plastic plates at positions corresponding to the scratched areas, thus accomplishing a pastel effect for the displayed letters, figures or symbols in day light and at night.

The heat dissipating bodies, set in the gaps between the lamps and the angled and segmented edge surfaces of the plastic plates and individually having an air ventilation hole, allow both the angled and segmented edge surfaces of the plastic plates and the edge color sheets to be almost permanently usable. In addition, a protection cover, made of a transparent color plastic plate or a transparent color glass plate, covers the display surface, thus protecting the display board and allowing the display board to be usable with lamps integrated with photograph frames, indoor or outdoor display bricks of a sidewalk, or for lighting applications.

The specifically designed transparent acrylic plastic plates of this invention also may be preferably used as the material of shades for indoor or outdoor lamps. When the plastic plates of this invention are used as the material of such lampshades, the construction and operational effect of the plastic plates are very similar to those described for the display board and further explanation is thus not deemed necessary.

In the present invention, the desired letters, figures, symbols, or a combination of them are formed on the transparent acrylic plastic plates of the display board and lampshade with a linear inscription process, a plane inscription process, and a scratching process. The display board or the lampshade of this invention thus accomplishes both a desired pastel effect and a desired cubic effect. In such a case, the pastel effect accomplishes enhanced light intensity of the display board and the lampshade due to the color sheets particularly in day light in addition to the nighttime. On the other hand, the cubic effect allows the displayed letters, figures, symbols, or a combination of them on the display surface to be shown as if they were deeply submerged into the interior of the board and of the shade.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
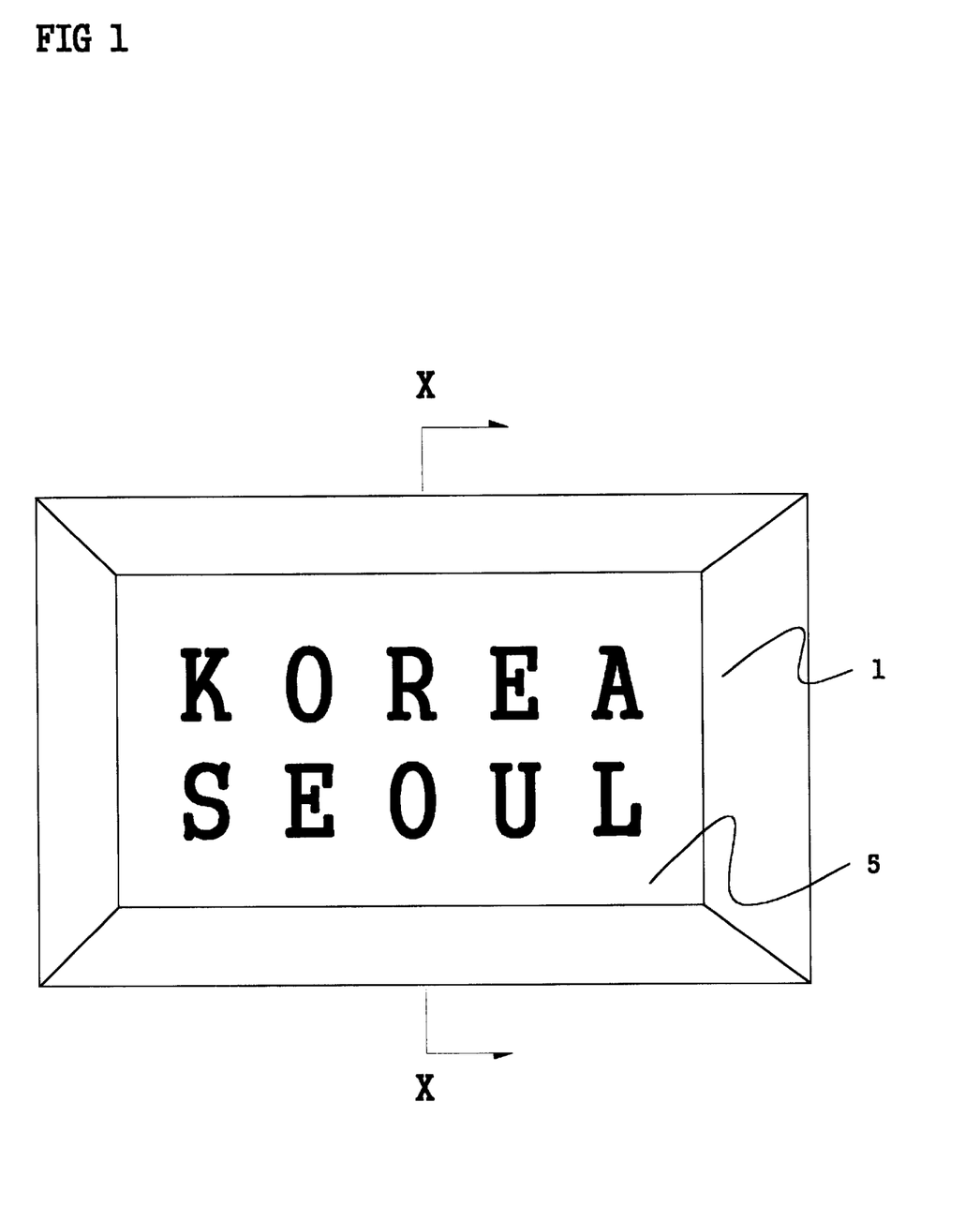
FIG. 1 is a front view of a light illuminated display board in accordance with the primary embodiment of the present invention.
Figure 2:
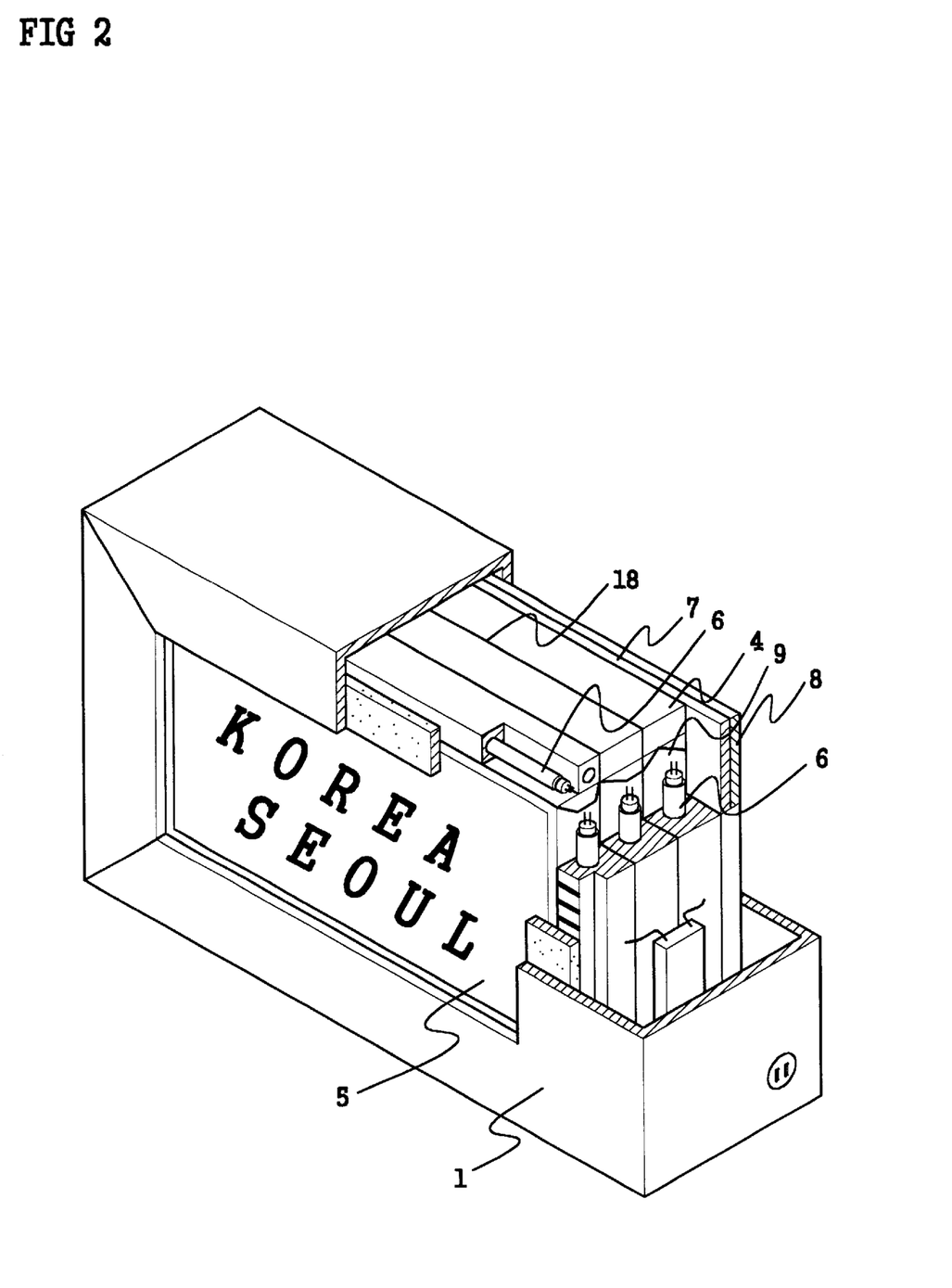
FIG. 2 is a partially broken perspective view of the display board of this invention.
Figure 3:
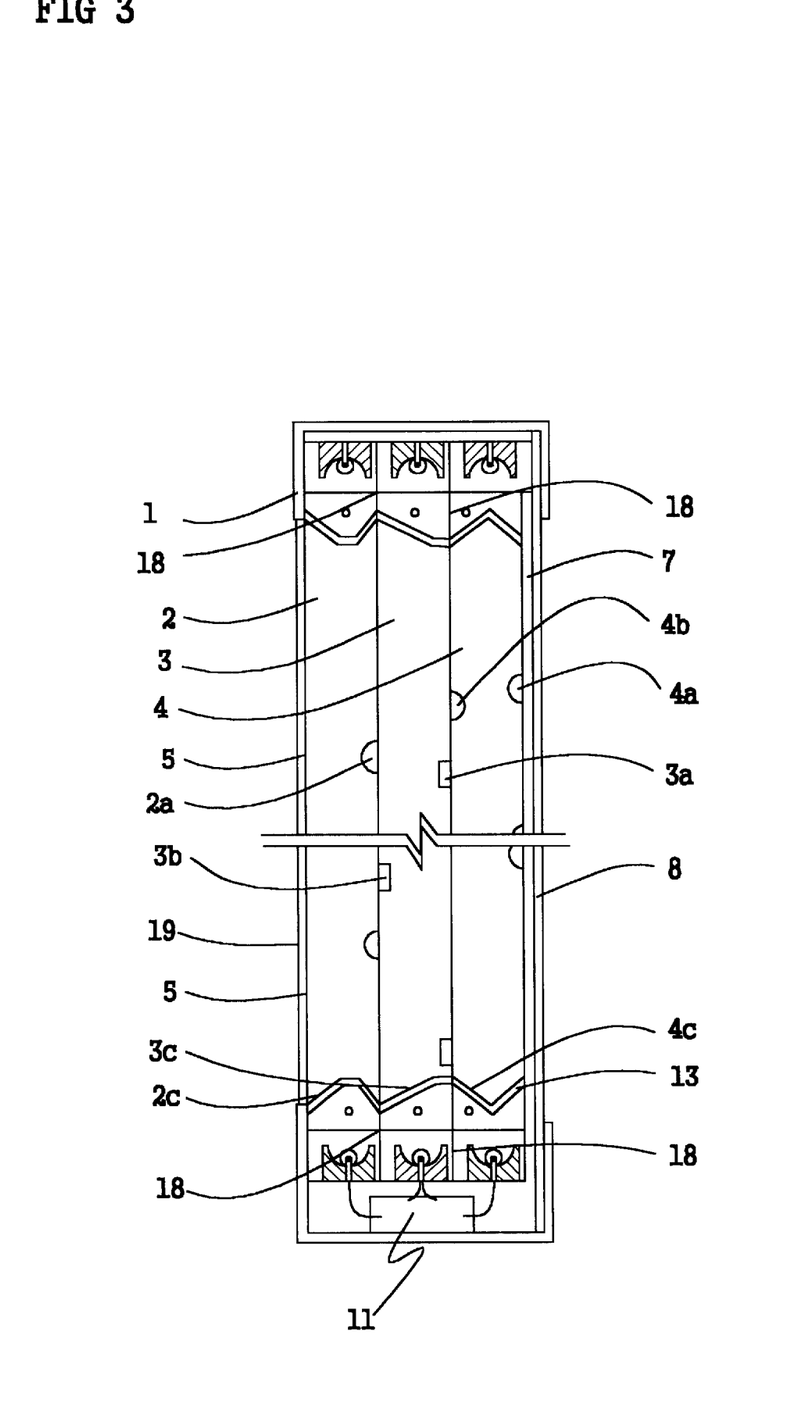
FIG. 3 is a sectional view of the display board taken along the line X—X of FIG. 1.

FIG. 1 is a front view of a light illuminated display board in accordance with the primary embodiment of the present invention. FIG. 2 is a partially broken perspective view of the above display board. FIG. 3 is a sectional view of the display board taken along the line X—X of FIG. 1. As shown in the drawings, the display board of this invention comprises a display board frame 1, with three laminated transparent acrylic plastic plates 2, 3 and 4 being vertically set within the frame 1. A plurality of light bulbs 6 are set along the four edges of each plastic plate 2, 3 or 4 within the frame 1. In order to separate the light bulb sets of the three plastic plates 2, 3 and 4 from each other, two lamp partition plates 18 are interposed in the laminated junctions of the three plastic plates 2, 3 and 4. The light bulbs 6 of each plastic plate 2, 3 or 4 emit light into the plastic plate 2, 3 or 4 through the four edge surfaces of the plastic plate 2, 3 or 4. The display board also has a PLC (programmable logic controller) 11 used for controlling the operation of the light bulbs 6. In the above display board, the three plastic plates 2, 3 and 4, the PLC 11 and the lamp partition plates 18 are stably and closely set within the frame 1 while being supported by a back plate 8 of the display board.

Figure 5:
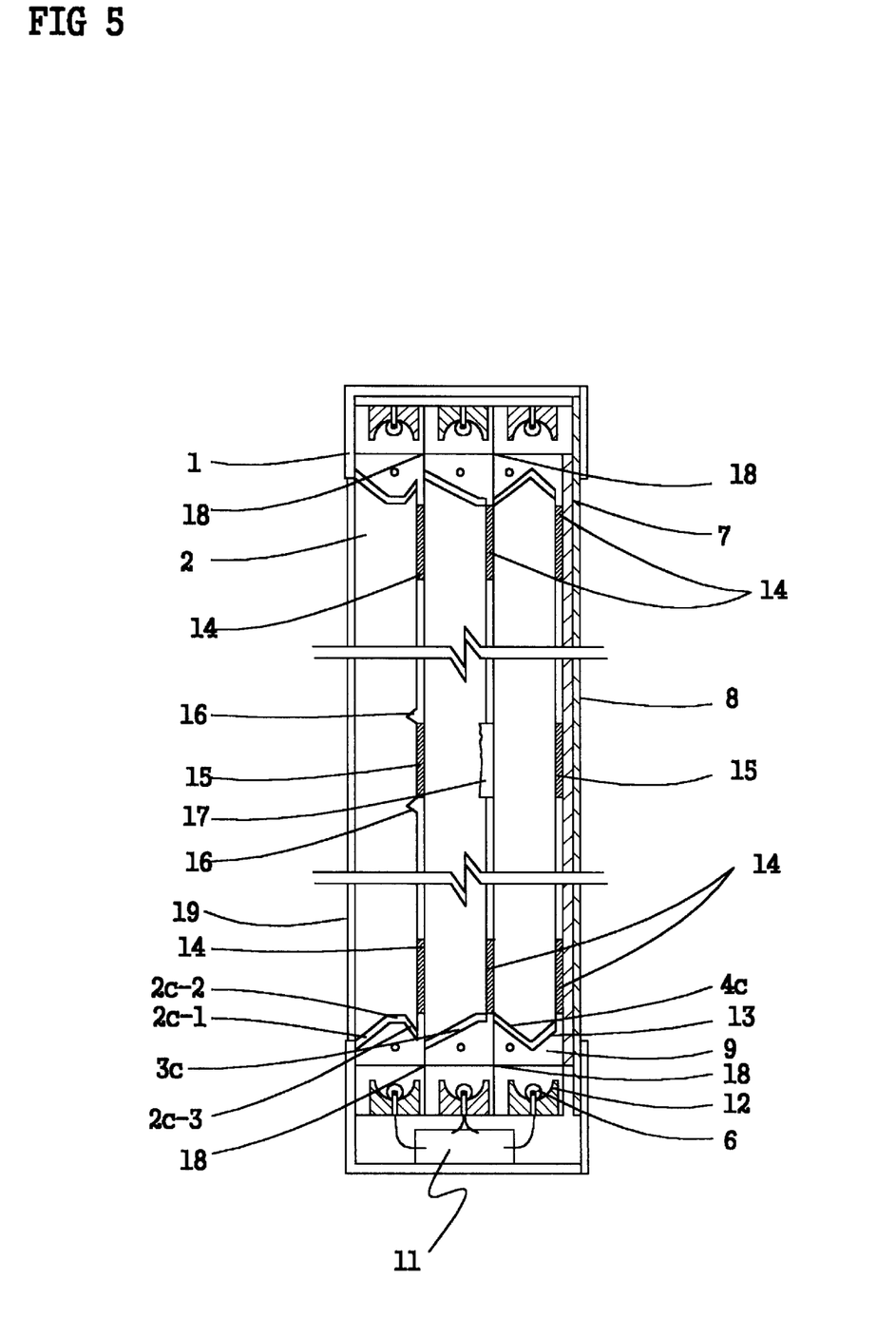
FIG. 5 is a sectional view of three transparent acrylic plastic plates vertically and parallely set within the display board of this invention, the three plates being individually inscribed with desired letters, symbols or figures.

In the display board of this invention, the three plastic plates 2, 3 and 4 are not directly laminated together, but are indirectly laminated with both a plurality of packings 14 having a thickness of about 0.5 cm and the lamp partition plates 18 being positioned in the laminated junctions between the three plastic plates 2, 3 and 4 as shown in FIG. 5. The above packings 14 effectively prevent a formation of water film at the laminated junctions between the three plates 2, 3 and 4 due to moisture laden in the plates 2, 3 and 4. The packings 14 also form desired spaces at the junctions between the plates 2, 3 and 4, thus desirably varying both the laminated structure of the three transparent plastic plates 2, 3 and 4 and the inscription type of advertisements or notices on the three plastic plates 2, 3 and 4 as will be described in detail later herein. This finally enhances the desired cubic effect for the advertisements or the notices.

When the two lamp partition plates 18 are positioned at the laminated junctions of the three plates 2, 3 and 4 with the bulbs 6 being controlled by the PLC 11 as described above, it is possible to completely change the colors of the letters and/or figures inscribed on the three plates 2, 3 and 4. This accomplishes an animation effect of the letters and/or figures. In addition, the above-mentioned structure allows a plurality of different color beams to be mixed together within each plastic plate 2, 3 or 4, thus allowing the display board of this invention to display a variety of colors different from conventional light illuminated display boards.

At least one of opposite surfaces of each plastic plate 2, 3 or 4 is inscribed with letters and/or figures corresponding to those of the displaying surface 5, or the front surface of the display board. A color reflection plate 7 is attached to the rear surface of the third plastic plate 4 at the junction between said plastic plate 4 and the back plate 8.

The above color reflection plate 7, attached to the rear surface of the third plastic plate 4, reflects light from the bulbs 6 forward and improves the cubic effect for the advertisements or notices of the display board. The above plate 7 is firmly held by the back plate 8 of the display board.

The four edge surfaces of each plastic plate 2, 3 or 4, with one light bulb 6 set along each edge surface, are precisely cut to form a variety of specifically angled and segmented surfaces 2c, 3c and 4c.

In the present invention, it is preferable to design the shapes of the four edge surfaces of each plastic plate 2, 3 or 4 to allow each edge surface to have two or three specifically angled surface segments as shown in FIG. 3. However, it should be understood that it is possible to cut the four edge surfaces of each plastic plate 2, 3 or 4 to allow each edge surface to have a specifically designed cross-section with four angled surface segments or five angled surface segments when necessary. That is, the four edge surfaces of each plastic plate 2, 3 or 4 may be somewhat freely designed to have a plurality of angled surface segments without affecting the functioning of this invention.

Different from the flat structure of the edge surfaces of each plastic board in conventional light illuminated display boards, the four edge surfaces of each plastic plate according to this invention are specifically shaped to have a variety of angled and segmented structures as described above. This is a very important point of the structure of this invention since such specifically angled and segmented surfaces increase the quantity of incident beams from the light bulbs in addition to an active variation of light transmitting passages within the plastic plates when the beams from the light bulbs pass through the angled and segmented edge surfaces. This finally allows the display board of this invention to freely display the letters and/or figures in a variety of colors different from conventional light illuminated display boards.

A plurality of light transmitting color sheets 13, having a variety of colors, are attached to the specifically angled and segmented surfaces 2c, 3c and 4c, which are formed on the edge surfaces of the plastic plates 2, 3 and 4 through a precision cutting process using a machine tool, such as a CNC lathe. Such color sheets 13 allow the display board of this invention to effectively display desired letters, figures and colors and an alteration or combination of them due to a light refraction and reflection effect of the angled and segmented surfaces 2c, 3c and 4c.

The above color sheets 13 are color bands formed by a combination of a plurality of narrow and wide lines having a variety of colors, luminosities and hues. In the present invention, such color bands are preferably designed using an appropriate program suitable for accomplishing an operational effect of the display board for displaying desired letters, figures and their combination on the display surface 5 while illuminating them by a variety of color light beams.

Figure 4:
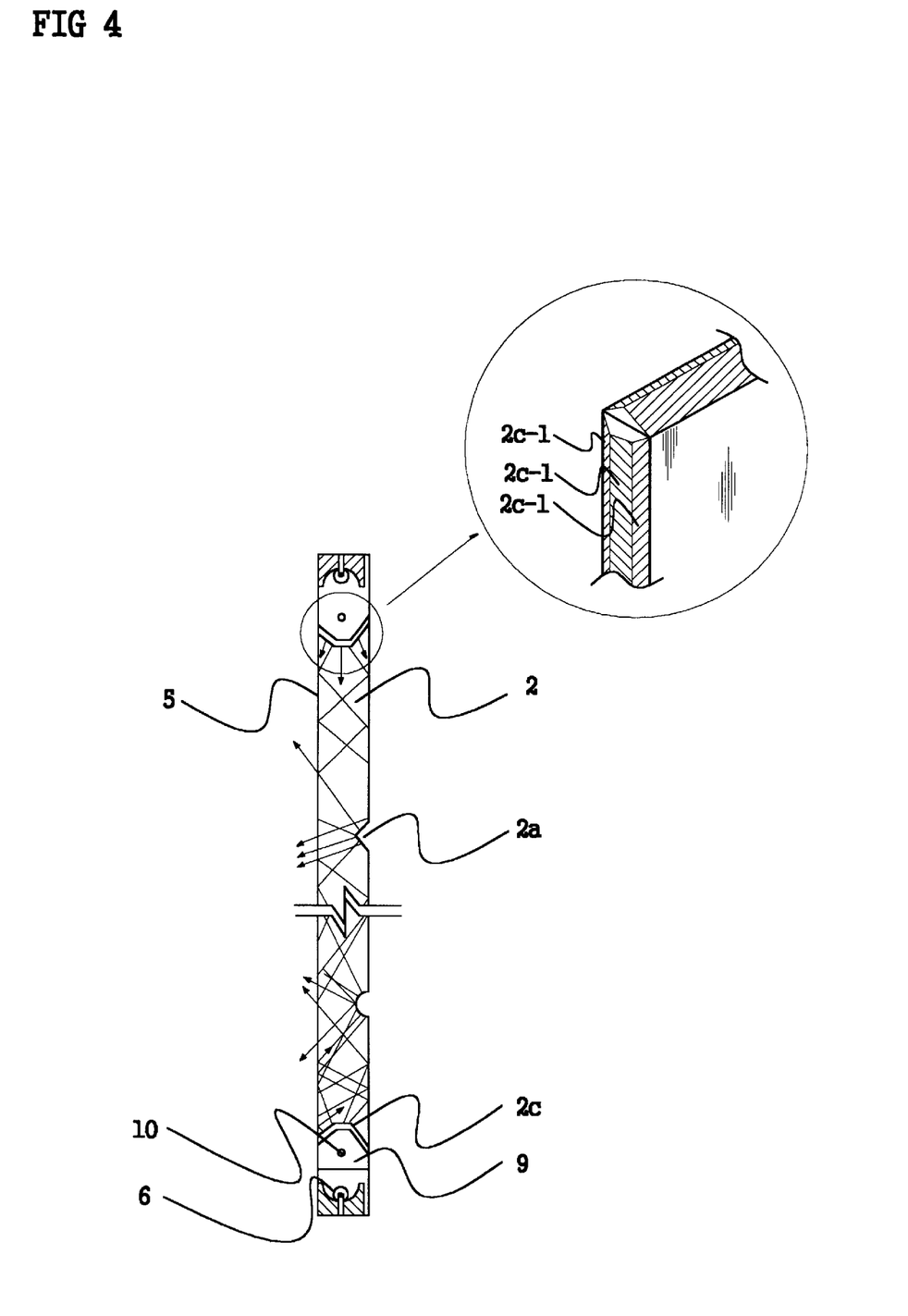
FIG. 4 is a sectional view of a transparent acrylic plastic plate, showing the light transmitting characteristics of the plate.

FIG. 5 shows an example of use of color sheets attached on the specifically angled and segmented surfaces 2c, 3c and 4c of the three plastic plates 2, 3 and 4. That is, in the case of the edge surfaces of the first plastic plate 2 shown in FIG. 4, a green sheet may be attached to the first segment 2c-1 of each angled and segmented edge surface, a scarlet sheet may be attached to the second segment 2c-2, and a purple sheet may be attached to the third segment 2c-3. In such a case, the incident color beams, received into the plastic plate 2 through the three differently angled color segments 2c-1, 2c-2 and 2c-3 of each angled and segmented edge surface, are reflected or refracted at the grooves, formed on the surfaces of the plastic plate due to the inscription of letters and/or figures. A variety of colors, formed by a combination or mixture of the color beams, are thus given to the letters and/or figures inscribed on the display surface of the display board.

A plurality of heat dissipating bodies 9, made of glass, are set in the gaps between the light bulbs 6 and the angled and segmented edge surfaces 2c, 3c and 4c of the plastic plates 2, 3 and 4, with an air ventilation hole 10 being longitudinally formed in each heat dissipating body 9. Such heat dissipating bodies 9, individually having an air ventilation hole 10, prevent heat of the bulbs 6 from being directly radiated to the angled and segmented edge surfaces 2c, 3c and 4c of the plastic plates 2, 3 and 4. The heat dissipating bodies 9 also actively and effectively dissipate heat of the bulbs 6 to the surroundings, thus allowing the display board of this invention to be completely free from the problems caused by heat of the bulbs 6.

In the above display board, light beams emitted from the bulbs 6 are transmitted into the transparent acrylic plastic plates 2, 3 and 4 after passing through the color sheets 13, attached to the edge surfaces 2c, 3c and 4c of the plastic plates 2, 3 and 4. In such a case, the inscribed portions, or the grooves 2a, 3a, 4a and 4b, the outline grooves 16 having a V-shaped cross-section, and the scratched areas 17 within the outline grooves 16 reflect and refract the light beams. The display board of this invention thus effectively displays desired advertisements or notices, formed by letters, figures and a combination of them, on its display surface 5. In such a case, the figures may be formed by specifically cut color sheets 15 as will be described later herein.

In such a case, any colored letters or figures are not projected from the remaining parts of the transparent plastic plates 2, 3 and 4 except for the inscribed portions to the display surface 5. The above remaining parts thus form a background illumination without having a difference in luminosity or color, with the desired advertisements or notices clearly and prominently displayed on the display surface 5.

In the display board of this present invention, the first plastic plate 2, or the plate forming the display surface 5 by its front surface, is preferably inscribed with the grooves 2a on its rear surface opposite to the display surface 5 as shown in FIG. 3. Meanwhile, the other two plastic plates, or the second and third plates 3 and 4, may be individually inscribed with the grooves 3a and 3b, 4a and 4b on their opposite surfaces.

In the present invention, it should be understood that the display surface 5 of the first plastic plate 2e may be inscribed with desired letters or figures. However, in such a case, the inscribed letters or figures of the display surface 5 may be easily deposited and contaminated with dust or dirt, thus allowing the display board to fail to accomplish a desired advertising effect. In order to overcome such problems caused by the dust or dirt deposited in the inscribed letters and figures of the display surface 5, it is preferable to provide a protection cover 19 on the display surface 5. Such a protection cover 19 may be preferably made of a specifically processed transparent plastic plate having a reinforced surface, a color acrylic plastic plate or a color glass plate.

Therefore, the present invention is preferably adapted to light illuminated display boards for table lamps integrated with photograph frames, light illuminated display boards attached to the indoor floors, and light illuminated display boards used as the outdoor bricks of a sidewalk.

When the present invention is adapted to a light illuminated display board for table lamps integrated with photograph frames, enlarged scratched areas 17 having a size similar to a desired photograph are formed on the rear surfaces of the second and third plastic plates 2 and 3, with a color plastic protection cover 19 being set within the display board. In addition, a negative film or a printed photographic image is closely attached to the front surface of the first transparent plastic plate 2. When the display board is illuminated by the light of bulbs 6, the display board displays a light illuminated photographic image on the front surface of the first plastic plate 2 in addition to accomplishing a desired lighting effect. On the other hand, when the present invention is adapted to light illuminated display boards for indoor floors, a color plastic protection cover 19 is set within each display board prior to setting the display boards on an existing indoor floor or on a newly arranged indoor floor at a desired area while accomplishing a desired balance of the floor. In such a case, due to the protection cover 19, the light illuminated display boards are free from damage at their surfaces even when people walk on the boards. When the display boards are illuminated by the light of bulbs 6, the display boards effectively display light illuminated letters or figures on their display surfaces while accomplishing a desired indoor lighting effect. The construction and operational effect of the light illuminated display boards for outdoor bricks of a sidewalk according to this invention remain the same as those described above, and so a further explanation for such display boards is thus not deemed necessary.

In addition to the letters and/or figures directly inscribed on at least one of opposite surfaces of each transparent plastic plate 2, 3 or 4, a specifically cut color sheet 15 may be attached to either surface of each plastic plate 2, 3 or 4 in order to allow the display board of this invention to accomplish a clear and prominent color image emerging effect when the display board is used in day light. Such a color sheet 15 is formed by appropriately cutting a color sheet or a color film in the form of a desired profile.

When it is desired to display the words "KOREA SEOUL" of FIG. 1, as an example, on the display surface 5 of a display board, consisting of three transparent acrylic plastic plates 2, 3 and 4 as shown in FIG. 2, the words "KOREA SEOUL" will be inscribed on the plastic plates of the display board as follows.

That is, the letters "KOR", designated by the reference numeral 2a, of the word "KOREA" are inscribed on the upper portion of the rear surface of the first plastic plate 2, while the remaining letters "EA", designated by the reference numeral 3a, of the word "KOREA" are inscribed on the upper portion of the rear surface of the second plastic plate 3 at a position aligned with the position of the letters "KOR" of the first plastic plate 2. Thereafter, the letters "SEO", designated by the reference numeral 4a, of the word "SEOUL" are inscribed on the lower portion of the rear surface of the third plastic plate 4, while the remaining letters "UL", designated by the reference numeral 4b, of the word "SEOUL" are inscribed on the lower portion of the front surface of the same plate 4 at a position aligned with the position of the letters "SEO" of the rear surface. The light illuminated display board of this invention thus completely displays the words "KOREA SEOUL" on its display surface 5 due to the light refraction and reflection effect in the same manner as that disclosed in U.S. Pat. No. 5,124,890 allowed to the inventor of this invention. A further explanation for such a light refraction and reflection effect for displaying the letters on the display surface 5 thus may be not deemed necessary.

Thereafter, a plurality of color sheets 13, each precisely cut in accordance with an appropriate program suitable for accomplishing the operational effect of the display board for displaying desired letters, figures and their color combination on the display surface 5, are attached to the angled and segmented surfaces 2c, 3c and 4c of the plastic plates 2, 3 and 4. When the plastic plates 2, 3 and 4 are illuminated by light from the bulbs 6, the inscribed letters and/or figures of the plates 2, 3 and 4 are displayed on the display surface 5 while being desirably colored. An example of coloring the letters and/or figures of the display board will be described hereinbelow.

Different color sheets are attached to the three precisely cut surface segments 2a-1, 2c-2 and 2c-3 of each specifically angled and segmented edge surfaces 2c of the first plate 2. That is, a green sheet is attached to the first segment 2c-1, a scarlet sheet is attached to the second segment 2c-2, and a purple sheet is attached to the third segment 2c-3. On the other hand, a red sheet is attached to each of the two surface segments of each angled and segmented edge surface 3c of the second plastic plate 3. In the case of the third plastic plate 4 with each angled and segmented edge surface 4c consisting of two surface segments, a yellow sheet is attached to one surface segment corresponding to the inscribed letters "SEO" 4a, while a blue sheet is attached to the remaining surface segment corresponding to the inscribed letters "UL" 4b. When all the light bulbs 6 of the display board are turned on to illuminate the three plastic plates 2, 3 and 4, the inscribed letters "KOR" 2a of the first plate 2 are illuminated in all directions by light beams having three different colors, or green, scarlet and purple. On the other hand, the inscribed letters "EA" 3a of the second plate 3 are illuminated in all directions by red light beams. Therefore, the word "KOREA" is clearly displayed on the upper portion of the display surface 5 of the display board as shown in FIG. 1 while being colored in four colors, or green, scarlet, purple and red.

On the other hand, the inscribed letters "SEO" 4a of the third plastic plate 4 are illuminated in all directions by yellow light beams, while the inscribed letters "UL" 4b of the same plate 4 are illuminated in all directions by blue light beams. Therefore, the words "KOREA SEOUL" are clearly displayed on the display surface 5 of the display board as shown in FIG. 1 while being illuminated and colored in six colors, or green, scarlet, purple, red, yellow and blue.

As described above, it is preferable to accomplish the inscription of desired letters, figures or symbols on the transparent acrylic plastic plates of the display board according to this invention by directly inscribing the letters, figures or symbols on the plastic plates at corresponding positions as shown in FIG. 3. Such plastic plates are, thereafter, closely laminated together, with the inscribed portions of the plates being precisely aligned with each other.

However, in place of the above-mentioned direct inscription of the letters, figures or symbols on the plastic plates 2, 3 and 4, it is also possible to form the desired letters, figures or symbols on the plastic plates by forming outline grooves 16, having a V-shaped cross-section, on the rear surface of the first plate 2 in a way such that the outline grooves 16 are formed along the edges of the desired letters, figures or symbols as shown in FIG. 5. In such a case, the rear surface of the second plastic plate 3 is scratched at areas, corresponding to the closed areas within the outline grooves 16 of the first plate 2, thus having scratched areas 17. In addition, a color sheet 15, formed by specifically cutting a light transmitting color sheet or a light transmitting color film in accordance with the profile of each scratched area 17, is attached to the front surface of the second plastic plate 3 at a position corresponding to the scratched area 17. When it is necessary to allow the display board to have a higher degree of light intensity, another color sheet 15, formed by cutting a light transmitting color sheet or a light transmitting color film in order to have the same profile as that of the color sheet 15 of the second plate 3, is attached to the rear surface of the third plate 4 at a position corresponding to the color sheet 15 of the second plate 3.

Thereafter, the above three transparent acrylic plastic plates 2, 3 and 4 are laminated together in a way such that the outline grooves 16 of the first plate 2, the scratched areas 17 and color sheets 15 of the second plate 3 and the color sheets 15 of the third plate 4 are completely aligned with each other. The three laminated plastic plates 2, 3 and 4 are, thereafter, set within the display board frame 1, thus forming a desired display board as shown in FIG. 5. Such a display board clearly displays the desired letters, figures or symbols on its display surface 5 while accomplishing a desired cubic effect and a desired pastel effect. In such a case, the cubic effect allows the displayed letters, figures or symbols on the display surface 5 to be shown as if they were deeply submerged into the interior of the board. On the other hand, the pastel effect accomplishes enhanced light intensity of the display board due to the color sheets 15 particularly in day light in addition to the nighttime.

Therefore, the display board of this invention effectively displays desired letters, figures and symbols in a variety of colors while accomplishing a desired color alteration effect, enhanced light intensity and controllable brightness of the display surface, and a desired cubic effect. In addition, since opposite surfaces of each transparent acrylic plastic plate in the display board of this invention may be used for inscription of desired letters, figures or symbols, it is possible to preferably save the plastic plates. The display board of this invention may be almost permanently usable, thus being free from forcing a user to repeatedly repair the board or change the board with a new one.

In the display board of this invention, the light transmitting color sheets 13, having a variety of colors, are attached to the specifically angled and segmented surfaces 2c, 3c and 4c of the plastic plates 2, 3 and 4, thus accomplishing a desired displaying effect of the display board with a variety of hues. When the above color sheets 13 are illuminated by the light bulbs 6, which are separated from each other by the lamp partition plates 18 and of which both the activated order and the light intensities are controlled by the PLC 11, it is possible for the display board to display the letters, figures and symbols on its display surface 5 in a variety of colors.

For example, four different color sheets 13, or a red sheet, a blue sheet, an orange color sheet and a yellow sheet, are attached to the specifically angled and segmented surfaces 2c, 3c and 4c of the plastic plates 2, 3 and 4, and are illuminated by the light bulbs 6 under the control of the PLC 11. The advertisements or notices, formed of the letters, figures and/or symbols inscribed on the surfaces of the plastic plates 2, 3 and 4, are thus clearly displayed on the display surface 5 while being illuminated by a single color light beams, such as red beams or blue beams, or multi-color light beams. In such a case, the display board accomplishes a desired animation effect, which allows the advertisements or notices to be shown as if they move on the display surface 5. The display board may be also designed to periodically change the colors of light beams while displaying the advertisements or notices on its display surface 5.

That is, the light bulbs 6 of the display board according to this invention may be selectively activated under the control of the PLC 11, and so the display board preferably accomplishes a fade-in and fade-out effect in addition to the animation effect. Due to such a fade-in and fade-out effect, the colors of light beams, passing through the color sheets 13 of the specifically angled and segmented edge surfaces 2c, 3c and 4c of the transparent acrylic plastic plates 2, 3 and 4, are instantaneously and completely altered. Due to a combination of the fade-in and fade-out effect with the animation effect, the desired advertisements or notices are thus variously and fantastically displayed on the display surface 5 while being illuminated by a variety of color beams. When such light illuminated display boards of this invention are used as conventional billboards, interior boards, Integrated image boards for logo & brand, sales advertising boards, and shades for lamps, they accomplish a desired advertising or noticing effect.

The specifically designed transparent acrylic plastic boards of this invention may be preferably used as the material of shades for indoor lamps, such as floor lamps and table lamps, since such transparent acrylic plastic plates refract and reflect light beams at their specifically angled and segmented edge surfaces in addition to their flat edge surfaces as described for the light illuminated display boards. When the invention is adapted to the shades for such indoor lamps, it is possible to enhance the interior decoration effect of the lamps in addition to an accomplishment of desired effect for clearly and fantastically displaying beautiful color figures, color letters or color characters on the shades. The lamps, with such shades capable of displaying color letters, figures, patterns, designs and a combination of them, also may be used for commercial applications requiring to accomplish an enhanced advertising effect.

Figure 6:
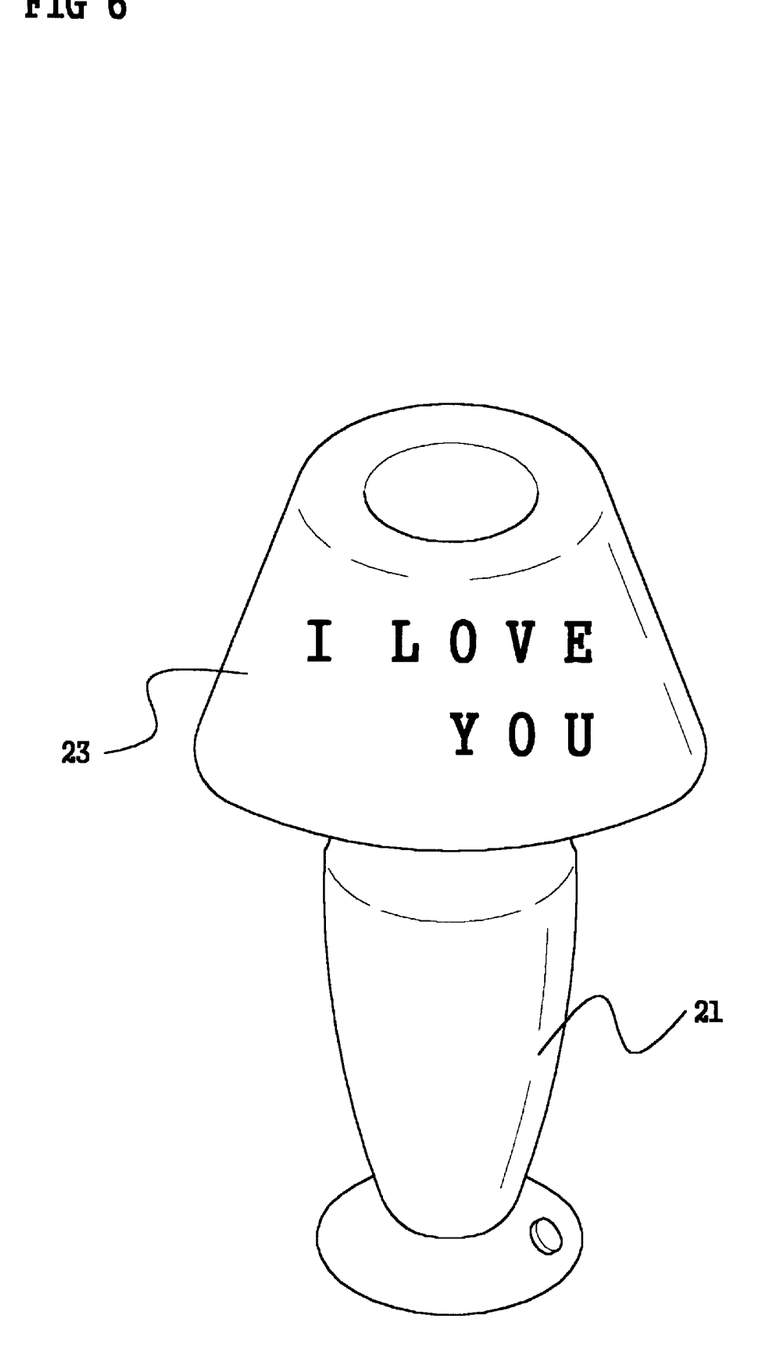
FIG. 6 is a perspective view of a table lamp provided with a shade in accordance with the second embodiment of the present invention.
Figure 7:
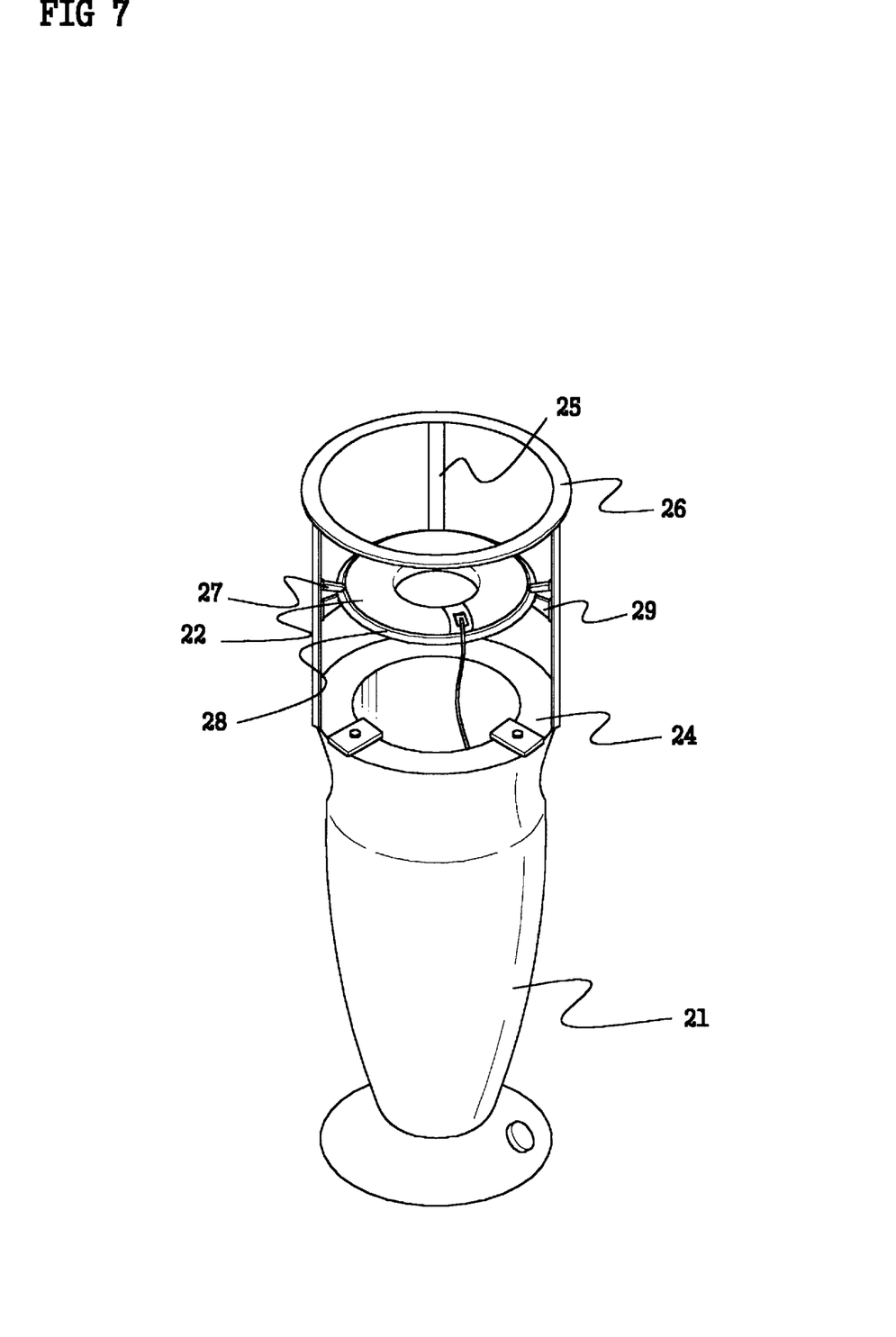
FIG. 7 is a perspective view of a lamp body of the above shaded lamp, with the shade being removed from the lamp body.
Figure 8:
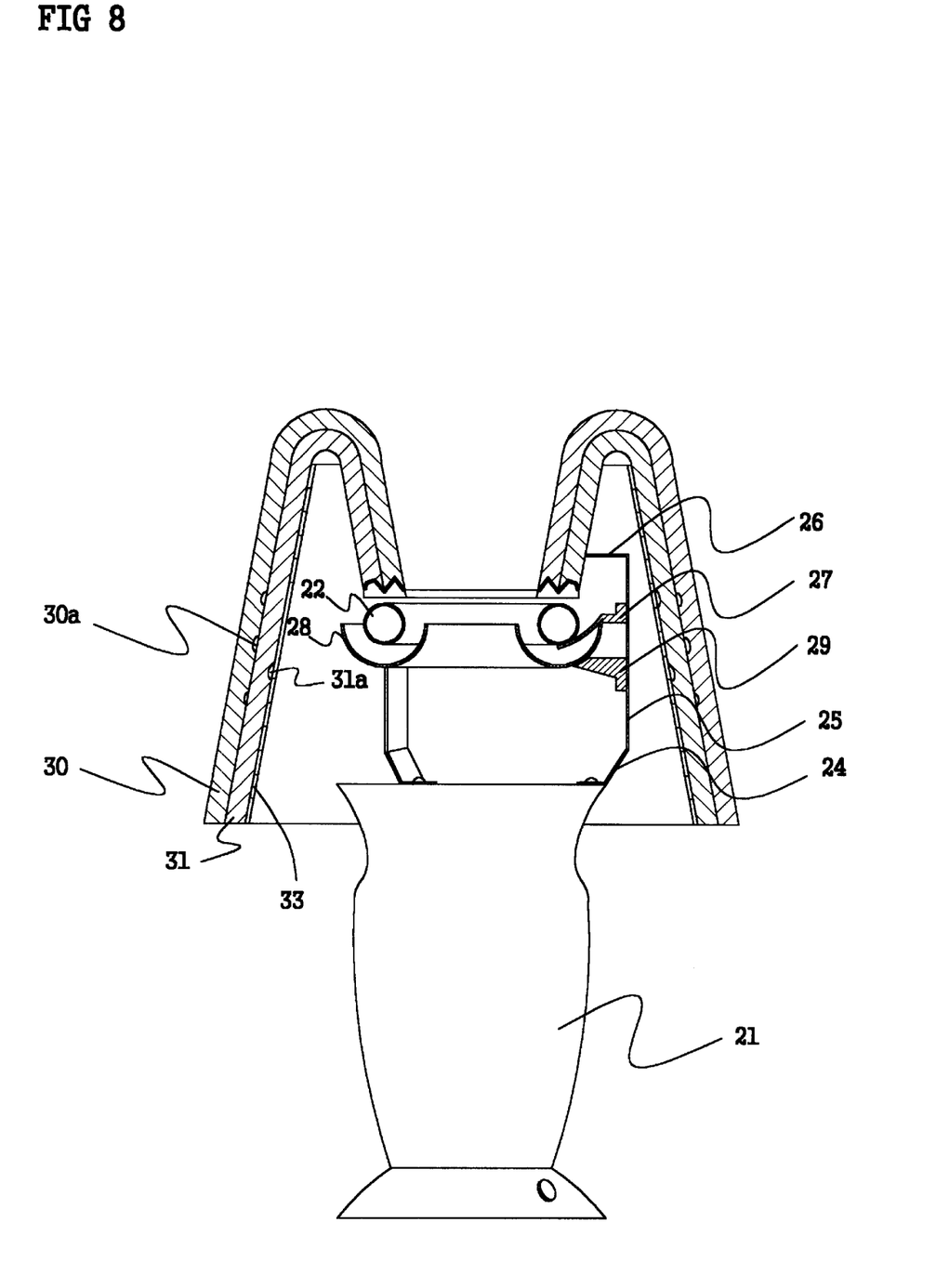
FIG. 8 is a sectional view of the shaded lamp of this invention.

An example of table lamps with such shades is shown in FIGS. 6 to 8. As shown in the drawing, the table lamp of this invention comprises a lamp body integrated with a stand 21. A circular fluorescent tube 22 is removably held by a plurality of tube holders 27 provided on a shade support 24, with the shade support 24 being firmly mounted to the top end of the body 21. This shade support 24 is used for supporting a shade 23 fabricated with the transparent acrylic plastic plates in accordance with the second embodiment of this invention. The above shade support 24 comprises a plurality of support columns 25 regularly and vertically mounted to the annular top end of the stand 21, with a shade support ring 26 commonly fixed to the top ends of the support columns 25 while being parallel to the annular top end of the stand 21.

An elastic tube holder 27 is mounted to a middle portion of each support column 25 and is used for holding a circular fluorescent tube 22. An annular reflection mirror 28, having a semicircular cross-section, is mounted to the middle portions of the support columns 25 by a plurality of support brackets 29. In such a case, the above reflection mirror 28 is positioned under the circular fluorescent tube 22 while being spaced apart from the bulb 22 at an interval. The above shade 23 is formed by closely laminating a plurality of transparent acrylic thin plastic plates prior to shaping the laminated plastic plates into a desired hollow conical configuration. The annular top end of the shade 23 is bent inwardly and downwardly, thus forming an inside reversed frustum part integrated with an outside normal frustum part.

The cross-section of the above shade 23 is best seen in FIG. 8. Of course, it should be understood that the shade 23 may be formed to have a cylindrical outside part in place of the above-mentioned outside frustum part without affecting the functioning of this invention. However, when the shade 23 is formed to have a cylindrical inside part in place of the above-mentioned inside frustum part, the shade 23 may reduce the lighting effect of the lamp.

The shade of FIG. 8 is fabricated with two transparent acrylic plastic plates 30 and 31, with the lower edge surfaces 30b and 31b of the two plates 30 and 31 at the inside reversed frustum part of the shade being used as light receiving surfaces that receive light from the circular fluorescent tube 22 into the shade.

In the above shade, the first transparent acrylic plastic plate 30 is precisely inscribed with an edge groove at the lower edge surface 30b of the inside frustum part. In the same manner, the second transparent acrylic plastic plate 31 is precisely inscribed with an edge groove at the lower edge surface 31b of the inside frustum part. The circular fluorescent tube 22 is held on the elastic tube holders 27 while being precisely aligned with the central axis of the annular reflection mirror 28, thus most effectively radiating light to the grooved edge surfaces 30b and 31b of the two plastic plates 30 and 31.

Figure 9:
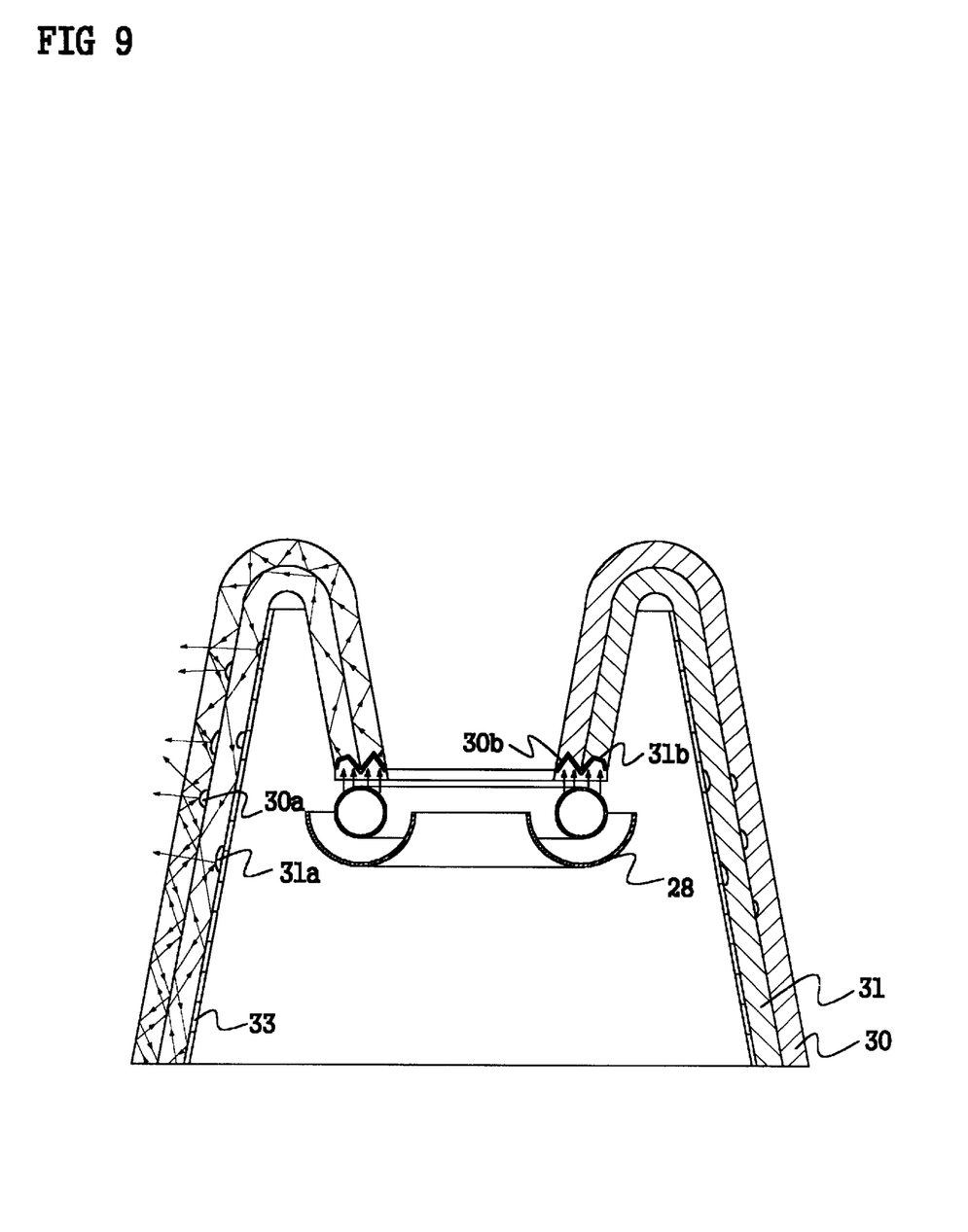
FIG. 9 is a sectional view of the frusto-conical lampshade according to this invention, showing the light transmitting characteristics of laminated transparent acrylic plastic plates of the above shade.

As shown in FIGS. 8 and 9, the two plastic plates 30 and 31 of the shade are inscribed with grooves 30a and 31a of desired letters, symbols or figures. A transparent or translucent sheet 33 is attached to the interior surface of the outside frustum part of the shade.

As best seen in FIG. 8, the two transparent acrylic plastic plates 30 and 31 are precisely inscribed with the edge grooves at the lower edge surfaces 30b and 31b of the inside frustum part. Each of the grooved edge surfaces 30b and 31b are precisely formed to have two or three surface segments having different angles, with a color sheet being attached to each surface segment.

The above grooved edge surfaces 30b and 31b receive light from the fluorescent tube 22 into the plastic plates 30 and 31 and the light is specifically refracted and reflected in the two plates 30 and 31 so as to display the desired letters, symbols or figures on the external surface of the shade.

In such a case, any colored letters, figures or symbols are not projected from the remaining parts of the transparent plastic plates 30 and 31 except for the inscribed portions to the external surface of the shade. The above remaining parts of the two plates 30 and 31 thus form a background illumination without having a difference in luminosity or color. Therefore, the desired letters, figures or symbols are clearly and prominently displayed on the external surface of the shade while being illuminated by light in the same manner as that described for the light illuminated display board.

The transparent or translucent sheet 33, attached to the interior surface of the outside frustum part of the shade, partially intercepts light radiated from the tube 22 in addition to reflecting the incident light within the two plastic plates 30 and 31. The above sheet 33 is also used for adjusting the background illumination of the shade and for preventing a contamination of the shade due to dust or dirt.

When it is desired to display a sentence "I LOVE YOU", as an example, on the external surface of the lampshade as shown in FIG. 6, the sentence "I LOVE YOU" will be inscribed on the plastic plates 30 and 31 of the shade as follows.

That is, the word "I", designated by the reference numeral 30a, of the sentence "I LOVE YOU" is inscribed on the upper portion of the rear surface of the first plastic plate 30, while the word "YOU", designated by the reference numeral 30a, is inscribed on the rear surface of the first plastic plate 30 at a lower position spaced from the word "I" to the right. On the other hand, the word "LOVE", designated by the reference numeral 31a, is inscribed on the rear surface of the second plastic plate 31 at a position aligned with the word "I" of the first plate 30. When the two laminated plastic plates 30 and 31 of the shade are illuminated by light of the fluorescent tube 22, the desired sentence "I LOVE YOU" is clearly displayed on the external surface of the shade while being light-illuminated.

Since each of the grooved edge surfaces 30b and 31b of the two plastic plates 30 and 31 are precisely formed to have two or three surface segments having different angles, with a color sheet being attached to each surface segment, it is possible to give desired colors to the sentence "I LOVE YOU" displayed on the external surface of the shade.

Figure 10:
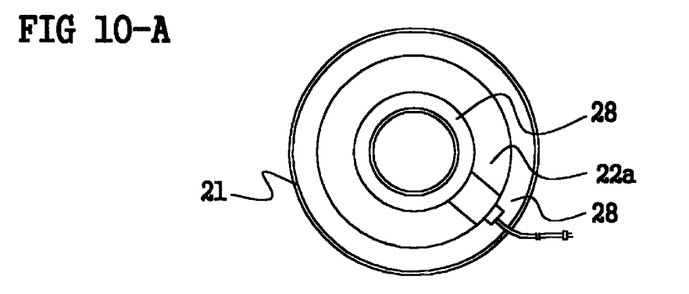
FIGS. 10a to 10c are front views of a variety of light sources preferably used with the shaded lamp in accordance with modifications of the second embodiment of this invention.

FIG. 9 shows an example of use of such color sheets attached on the specifically angled and segmented edge surfaces 30b and 31b of the two plastic plates 30 and 31. That is, in the case of the grooved edge surface 30b of the first plastic plate 30, a green sheet may be attached to each of the two surface segments. In the case of the grooved edge surface 31b of the second plastic plate 31, two red sheets are attached to the outside surface segments of the three segments, with a yellow sheet being attached to the middle surface segment of the three segments. When the fluorescent tube 22 of the lamp is turned on, the words "I" and "YOU" are displayed on the external surface of the shade while being illuminated by green light. On the other hand, the word "LOVE" is displayed on the external surface of the shade while being illuminated by red light at its upper portion and by yellow light at its lower portion, with the middle portion between the upper and lower portions of the word "LOVE" being illuminated by faint blended color light. In the lamp of this invention, it is possible to selectively use a circular fluorescent tube 22a of FIG. 10a, a plurality of small-sized longitudinal incandescent tubes 22b regularly arranged to form a chained circle as shown in FIG. 10b, or a plurality of conventional small-sized incandescent bulbs 22c regularly arranged to form a chained circle as shown in FIG. 10c.

In the case of circularly chained incandescent tubes 22b or bulbs 22c, both the activated order and the light intensities of the tubes 22b or bulbs 22c are controlled by a PLC (programmable logic controller). It is thus possible for the lampshade of this invention to clearly display the desired letters, figures and symbols on its external surface in a variety of colors.

As described above, the present invention provides a light illuminated display board and a lampshade using a light refraction and reflection effect in the laminated transparent acrylic plastic plates. In the present invention, each of the laminated plastic plates is precisely cut at four edge surfaces thereof to form specifically angled and segmented edge surfaces individually having two to five surface segments. In addition, at least one of opposite surfaces of each plastic plate is inscribed with desired letters, symbols or figures. Therefore, the display board or the shade of this invention clearly displays the desired letters, symbols or figures on its display surface while illuminating them using a variety of color light beams in addition to saving the transparent acrylic plastic plates.

In the present invention, a heat dissipating body is set in each gap between the light bulbs and the angled and segmented edge surfaces of the plastic plates. It is thus possible to actively and effectively dissipate heat of the bulbs to the surroundings, and so the display board or the shade of this invention is usable for a lengthy period of time without being thermally distorted or damaged.

In addition, each transparent acrylic plastic plate of this invention may be provided with grooves having a V-shaped cross-section, scratched areas, and specifically cut color sheets on at least one of opposite surfaces thereof, thus accomplishing a clear displaying effect in addition to a cubic effect for the desired letters, symbols or figures.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a light illuminated display board fabricated with a plurality of laminated transparent acrylic plastic plates, a plurality of lamps set along the edges of each of said plastic plates and controlled by a programmable logic controller (PLC), and a display board frame setting the laminated plastic plates, the lamps and the PLC therein in cooperation with a back plate, the improvement comprising:

the plastic plates laminated, with a plurality of packings positioned in laminated junctions between the plastic plates at corners of the plates so as to form a space in said laminated junctions, said plastic plates being also precisely cut at their edges to form specifically angled and segmented edge surfaces individually having two to five surface segments, with a plurality of edge color sheets being attached to the surface segments so as to allow desired letters, figures, symbols or a combination of them to be illuminated by desired color light beams while being displayed on a display surface, said desired letters, figures or symbols being formed by inscribing outline grooves of the letters, figures or symbols, having a V-shaped cross-section, on a rear surface of a first plastic plate, and by scratching a rear surface of a middle plastic plate at areas corresponding to closed areas within said outline grooves, and by attaching a plurality of specifically cut color sheets, having shapes corresponding to profiles of the scratched areas, to both a front surface of said middle plastic plate and a rear surface of a last plastic plate at positions corresponding to the scratched areas;

a plurality of heat dissipating bodies set in gaps between the lamps and the angled and segmented edge surfaces of the plastic plates, with an air ventilation hole being longitudinally formed in each of said heat dissipating bodies; and a color reflection plate attached to the rear surface of said last plastic plate at a junction between said last plastic plate and the back plate, whereby said plastic plates are laminated together, with the outline grooves, the scratched areas and the specifically cut color sheets of the plastic plates being precisely aligned with each other.

2. The display board according to claim 1, wherein said plastic plates are precisely cut at their edges to form the specifically angled and segmented edge surfaces individually having two to five surface segments, with said edge color sheets being attached to the surface segments of the angled and segmented edge surfaces of the plastic plates and consisting of color bands formed by a combination of a plurality of narrow and wide lines having a variety of colors, luminosities and hues.

3. The display board according to claim 1, wherein said plastic plates are laminated together, with the packings positioned in the laminated junctions between the plastic plates so as to prevent a formation of water film at the laminated junctions and to form spaces at the laminated junctions and adding the color reflection plate, for accomplishing a cubic effect for the letters, figures or symbols displayed on the display surface.

4. The display board according to claim 1, wherein a plurality of lamp partition plates are positioned at the laminated junctions of the plastic plates so as to change colors of the letters, figures or symbols displayed on the display surface while accomplishing an animation effect for the displayed letters, figures or symbols.

5. The display board according to claim 1, wherein the scratched areas are formed on opposite surfaces of the plastic plates, for pastel effect as scratched areas, with the specifically cut color sheets being attached to infront of the plastic plate and next plastic plates at positions corresponding to the scratched areas, thus accomplishing a display effect for the displayed letters, figures or symbols in day light and at night.

6. The display board according to claim 1, wherein the heat dissipating bodies are set in the gaps between the lamps and the angled and segmented edge surfaces of the plastic plates and individually have an air ventilation hole, thus allowing both the angled and segmented edge surfaces of the plastic plates and the edge color sheets to be almost permanently usable.

7. The display board according to claim 1, wherein a protection cover, made of a transparent color plastic plate or a transparent color glass plate, covers the display surface, thus allowing the display board to be usable with lamps integrated with photograph frames, floors of indoor, outdoor display bricks of a sidewalk, or for lighting applications.

8. A light illuminated shade for lamps, comprising:

a plurality of transparent acrylic thin plastic plates closely laminated together and shaped into a hollow conical configuration, with an annular top end portion of said conically shaped and laminated plastic plates being bent inwardly and downwardly so as to form an inside reversed frustum part integrated with an outside normal frustum part, said transparent acrylic plastic plates being also precisely cut at their lower edges of the inside frustum part so as to form grooved edge surfaces individually having specifically angled two or three surface segments, said plastic plates being inscribed with grooves of desired letters, symbols, figures or a combination of them, whereby the desired letters, symbols, figures or the combination of them are displayed on an external surface of the outside frustum part when light of a circular light source is received into the laminated plastic plates through the grooved edge surfaces used as light receiving surfaces of the plastic plates.

9. The shade for lamps according to claim 8, wherein a plurality of light transmitting color sheets, having a variety of colors, are attached to the surface segments of the grooved edge surfaces of the plastic plates, thus forming color layers on the light receiving surfaces of the plastic plates.

10. The shade for lamps according to claim 8, wherein a light reflection mirror is positioned opposite to the circular light source so as to reflect the light of the light source to the light receiving surfaces of the plastic plates.

11. The shade for lamps according to claim 10, wherein both activated order and light intensity of said circular light source are controlled by a programmable logic controller.

* * * * *